(12) United States Patent
So et al.

(10) Patent No.: US 11,799,189 B2
(45) Date of Patent: Oct. 24, 2023

(54) ELECTRONIC DEVICES HAVING ANTENNA ASSEMBLIES

(71) Applicant: Hewlett-Packard Development Company, L.P., Spring, TX (US)

(72) Inventors: Yu Chen So, Taipei (TW); Ju-Hung Chen, Taipei (TW); Lien-Chia Chiu, Taipei (TW); Hao Ming Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 90 days.

(21) Appl. No.: 17/047,171

(22) PCT Filed: Jul. 19, 2018

(86) PCT No.: PCT/US2018/042781
§ 371 (c)(1),
(2) Date: Oct. 13, 2020

(87) PCT Pub. No.: WO2020/018095
PCT Pub. Date: Jan. 23, 2020

(65) Prior Publication Data
US 2021/0167485 A1 Jun. 3, 2021

(51) Int. Cl.
*H01Q 1/22* (2006.01)
*G06F 1/16* (2006.01)
*H01Q 1/42* (2006.01)
*H04B 1/034* (2006.01)

(52) U.S. Cl.
CPC ......... *H01Q 1/2266* (2013.01); *G06F 1/1698* (2013.01); *H01Q 1/42* (2013.01); *H04B 1/034* (2013.01)

(58) Field of Classification Search
CPC ...... H01Q 1/2266; H01Q 1/42; G06F 1/1698; G06F 1/1656; H04B 1/034
See application file for complete search history.

(56) References Cited

U.S. PATENT DOCUMENTS

| | | | |
|---|---|---|---|
| 5,828,341 A * | 10/1998 | Delamater | G06F 1/1616 343/702 |
| 6,285,328 B1 * | 9/2001 | Masaki | H01Q 1/2266 343/702 |
| 6,531,985 B1 * | 3/2003 | Jones | G06F 1/1616 343/702 |
| 6,654,231 B2 * | 11/2003 | Teshima | H01Q 1/2266 361/730 |

(Continued)

FOREIGN PATENT DOCUMENTS

| CN | 1347280 A | 5/2002 |
|---|---|---|
| CN | 102736692 A | 10/2012 |

(Continued)

*Primary Examiner* — Hai V Tran
*Assistant Examiner* — Bamidele A Jegede
(74) *Attorney, Agent, or Firm* — Knobbe, Martens, Olson & Bear, LLP (57) ABSTRACT

In one example, an electronic device may include a housing having an opening and an antenna assembly disposed in the housing. The antenna assembly may include an antenna mounted to the housing, an antenna module disposed corresponding to the opening, and a cable to connect the antenna to the antenna module via routing the cable through the opening.

14 Claims, 4 Drawing Sheets

(56) References Cited

U.S. PATENT DOCUMENTS

| | | | | |
|---|---|---|---|---|
| 6,809,690 B2* | 10/2004 | Tao | ........................ | G06F 1/1637 343/702 |
| 7,277,738 B2 | 10/2007 | Reece et al. | | |
| 2002/0036897 A1* | 3/2002 | Nakajima | ............ | H01Q 1/2266 343/702 |
| 2002/0080565 A1* | 6/2002 | Teshima | ............... | H01Q 1/2266 343/702 |
| 2004/0051670 A1* | 3/2004 | Sato | ........................ | H01Q 13/10 343/702 |
| 2004/0070543 A1* | 4/2004 | Masaki | ................ | H04B 7/0805 343/702 |
| 2004/0209646 A1* | 10/2004 | Murayama | ............ | G06F 1/1683 455/556.1 |
| 2005/0075136 A1* | 4/2005 | Cromer | ................ | H01Q 1/2266 455/556.1 |
| 2005/0093753 A1* | 5/2005 | Masaki | ................ | H01Q 1/2266 343/702 |
| 2005/0285796 A1* | 12/2005 | Lee | ........................ | G06F 1/1616 343/702 |
| 2006/0139220 A1* | 6/2006 | Hirota | ................. | H01Q 1/2291 343/702 |
| 2007/0115188 A1* | 5/2007 | Mizoguchi | ........... | H01Q 1/2266 343/702 |
| 2007/0252823 A1* | 11/2007 | Hirota | ................ | G06F 1/1643 345/173 |
| 2008/0024970 A1 | 1/2008 | Lee | | |
| 2008/0039160 A1* | 2/2008 | Homer | ................. | H01Q 1/2275 455/272 |
| 2008/0151978 A1* | 6/2008 | Hirota | ................ | H04B 1/0057 375/222 |
| 2009/0015484 A1* | 1/2009 | Coskun | .................... | H01Q 1/38 343/700 MS |
| 2009/0122847 A1 | 5/2009 | Nysen | | |
| 2009/0316612 A1 | 12/2009 | Poilasne et al. | | |
| 2009/0322626 A1 | 12/2009 | Sato | | |
| 2010/0067186 A1* | 3/2010 | Aya | ........................ | G06F 1/1616 361/679.28 |
| 2010/0073897 A1* | 3/2010 | Tachikawa | ............ | G06F 1/1616 361/752 |
| 2010/0188299 A1 | 7/2010 | Rinehart et al. | | |
| 2010/0197261 A1 | 8/2010 | Zibrik et al. | | |
| 2011/0090623 A1* | 4/2011 | Liu | ........................ | G06F 1/1616 361/679.01 |
| 2011/0199265 A1* | 8/2011 | Lin | ........................ | H01Q 5/378 343/700 MS |
| 2011/0216492 A1* | 9/2011 | Murakata | ............... | G06F 1/1681 343/702 |
| 2011/0310536 A1* | 12/2011 | Uttermann | ............... | G06F 1/166 361/679.01 |
| 2012/0133565 A1* | 5/2012 | Konanur | ............... | H01Q 13/203 343/791 |
| 2012/0146859 A1* | 6/2012 | Hirota | .................. | H01Q 1/2266 343/702 |
| 2012/0162890 A1* | 6/2012 | Chuang | ................. | G06F 1/1616 361/679.09 |
| 2012/0212912 A1 | 8/2012 | Tanaka et al. | | |
| 2012/0257350 A1* | 10/2012 | Chen | ........................ | G06F 1/188 361/679.55 |
| 2012/0262344 A1* | 10/2012 | Tsai | ..................... | H01Q 1/2266 343/702 |
| 2013/0002519 A1 | 1/2013 | Camacho et al. | | |
| 2013/0229753 A1* | 9/2013 | Hsiu | ....................... | G06F 1/166 361/679.01 |
| 2014/0132459 A1* | 5/2014 | Hu | ........................ | H01Q 1/2266 343/702 |
| 2014/0361932 A1* | 12/2014 | Irci | ..................... | H01Q 1/2266 343/702 |
| 2015/0016057 A1* | 1/2015 | Fu | ............................ | G06F 1/203 60/527 |
| 2015/0270599 A1* | 9/2015 | Guterman | ............ | H05K 9/0054 343/702 |
| 2016/0141745 A1 | 5/2016 | Wang | | |
| 2016/0149288 A1 | 5/2016 | Wang | | |
| 2016/0261022 A1 | 9/2016 | Guterman et al. | | |
| 2016/0308267 A1 | 10/2016 | Sharp et al. | | |
| 2016/0327986 A1* | 11/2016 | Farahani | ................ | G06F 1/169 |
| 2017/0117611 A1* | 4/2017 | Lepe | ....................... | H01Q 13/10 |
| 2017/0294825 A1* | 10/2017 | Waikar | .................... | H02K 11/33 |
| 2018/0113493 A1* | 4/2018 | Silvanto | ................ | G06F 1/1683 |
| 2018/0131091 A1* | 5/2018 | Chang | .................... | H01Q 5/335 |
| 2019/0027808 A1* | 1/2019 | Mow | ........................ | H04R 5/04 |

FOREIGN PATENT DOCUMENTS

| | | |
|---|---|---|
| CN | 204067560 U | 12/2014 |
| CN | 206431521 U | 8/2017 |
| JP | 11-316811 A | 11/1999 |

* cited by examiner

ELECTRONIC DEVICES HAVING ANTENNA ASSEMBLIES

BACKGROUND

Portable electronic devices are becoming increasingly popular. Examples of portable electronic devices may include handheld, computers (e.g., notebooks, tablets, and the like), cellular telephones, media players, and hybrid devices which include the functionality of multiple devices of this type. Due in part to their mobile nature, such electronic devices may often be provided with wireless communications capabilities, which may rely, on antenna technology to radiate radio frequency (RF) signals for transmission as well as to gather RF broadcast signals for reception.

BRIEF DESCRIPTION OF THE DRAWINGS

Examples are described in the following detailed description and in reference to the drawings, in which.

DETAILED DESCRIPTION

Electronic devices such as mobile phones, notebooks, tablets, personal digital assistants (PDAs), or the like may have wireless communications capabilities. Such electronic devices may wirelessly communicate with a communications infrastructure to enable the consumption of digital media content. In order to wirelessly communicate with other devices, the electronic devices may be provided with antenna assemblies including antennas and antenna modules (i.e., radio frequency modules to transmit and/or receive the antenna signals). The antennas and antenna modules may be connected via coaxial cables.

Electronic devices may include a display housing and a base housing pivotally, detachably, or twistably connected to the display housing. The base housing may be formed of a top cover (e.g., that accommodates a keyboard and a touch-pad on a surface) and a bottom cover (e.g., to support the electronic device on, a support surface). The use of antennas such as fifth generation (5G) antennas may be increasing in the electronic devices. The placement of the antennas may enhance the antenna performance. In some examples, the antennas may be disposed in the base housing. For example, the antennas can be attached to the top cover (e.g., a C-cover) or the bottom cover (e.g., a D-cover) of an electronic device. Attaching the antenna to the bottom cover may provide an enhanced antenna performance compared to attaching the antenna to the top cover.

However, attaching the antenna to the bottom cover while attaching the antenna module to the top cover (e.g., via a circuit board) may involve complexity in service and assembly of the electronic device as the coaxial cable that connects the antenna and the antenna module can get in the way, thereby causing service and assembly issues. For example, the cables may be routed between electronic components to connect the antennas and the antenna modules that are located within an enclosure. During assembly and/or service of the electronic device, the antenna that is fixed to the bottom cover may generate a blind assembly condition where connecting terminals of the cables cannot be viewed during assembly and/or service.

Examples described herein may provide an electronic device including an opening in a foot pad area. Examples described herein may route the cable that connects the antenna and the antenna module through the opening, which can simplify the electronic device assembly and service. In this example, the opening may facilitate service and assembly access to the cable and the antenna module. Further, the antenna may be fixed to the bottom cover of the electronic device, thereby enhancing the antenna performance. Furthermore, examples described herein may reduce manufacturing and servicing costs associated with the electronic devices.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

Examples described herein may provide an electronic device including a housing with an opening (e.g., in a foot pad area) and an antenna assembly disposed in the housing. The antenna assembly may include an antenna mounted to the housing, an antenna module disposed corresponding to the opening, and a cable to connect the antenna and the antenna module via routing the cable through the opening. The opening may facilitate service and assembly access to a connection between the cable and the antenna module. Examples described herein may be applicable to antenna assemblies where an antenna and an antenna module are mounted to different covers that form an electronic device housing and connected via a cable.

Figure 1A:
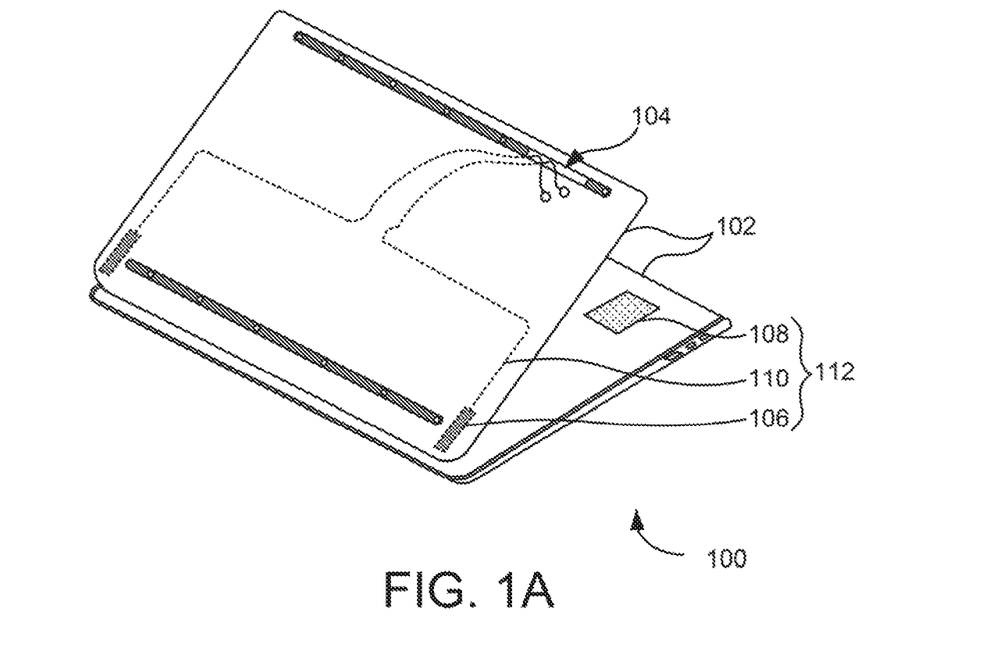
FIG. 1A is a perspective bottom view of an example electronic device, depicting a cable that is routed via an opening to connect an antenna to an antenna module.

FIG. 1A is a perspective bottom view of an example electronic device 100, depicting a cable 110 that is routed via an opening 104 to connect an antenna 106 to an antenna module 108. Example electronic device 100 may include a cellular phone, a notebook, a tablet, a personal computer (PC), a personal digital assistant, or any other device having wireless connectivity capability.

Example electronic device 100 may include a housing 102 having opening 104. Example electronic device 100 may include an antenna assembly 112 disposed in housing 102. In one example, antenna assembly 112 may include antenna 106 mounted to housing 102 and, antenna module 108 disposed corresponding to opening 104. Antenna 106 and antenna module 108 may be attached to different covers that form housing 102. Also, antenna assembly 112 may include cable 110 to connect antenna 106 to antenna module 108 via routing cable 110 through opening 104.

For example, one end of cable 110 may be connected to antenna 106 and other end of cable 110 may be connected to antenna module 108 (e.g., at a connector) via opening 104. Example cable 110 may be a coaxial cable. Example coaxial cable may include feed structures such as flex circuit material, wire cable, fiber optic cable, micro-coax cable, or other flexible conductive material that can be routed between antenna 106 and antenna module 108.

Example antenna module 108 may include a transceiver circuitry, filtering circuitry, transmission line structures, amplifier circuitry, data conversion circuitry, matching circuitry, control logic, and/or any other desired circuitry for handling radio frequency (RF) signals in a corresponding frequency band. Antenna module 108 may be formed on a respective integrated circuit (i.e., chip). In other examples, example electronic device 100 may include multiple antenna modules that can be formed on a common integrated circuit, chip or on separate integrated circuits. Further, example antenna module 108 may receive RF signals via antenna 106. Example antenna 106 may be a surface mounted antenna, such as, but not limited to, a patch antenna. Example antenna 106 may be used for handling millimeter wave communications or 5G communications. In other examples, antenna 106 may include a third-generation (3G) wireless antenna, a Bluetooth antenna, a wireless local area network (WLAN) antenna, and/or a global positioning system (GPS) antenna. In other examples, electronic device 100 may include multiple antennas, as shown in FIG. 1B.

Figure 1B:
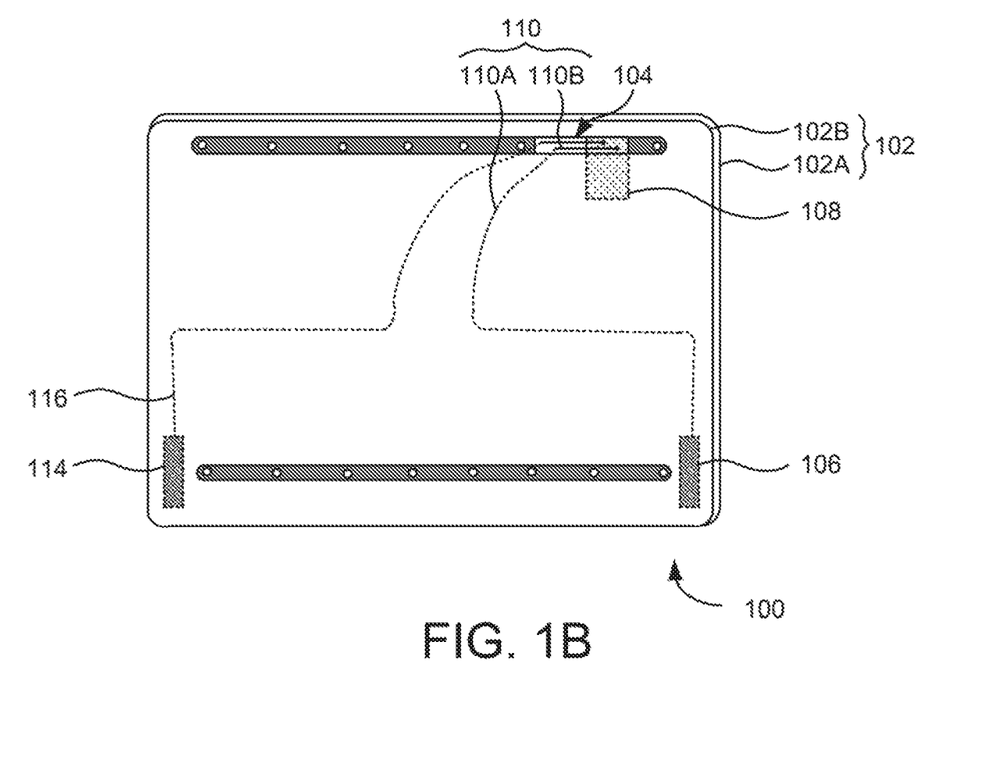
FIG. 1B is a bottom view of a bottom cover of the electronic device of FIG. 1A, depicting the cable connected to the antenna module via the opening.

FIG. 1B is a bottom view of a bottom cover 102B of electronic device 100, depicting cable 110 connected to antenna module 108 via opening 104. For example, similarly named elements of FIG. 1B may be similar in structure and/or function to elements described with respect to FIG. 1A. As shown in FIG. 1B, example housing 102 may be formed via attaching a top cover 102A to bottom cover 102B. In one example, opening 104 may be defined in bottom cover 102B of housing 102. Further, antenna 106 may be disposed in housing 102 and attached to bottom cover 102B. Furthermore, antenna module 108 may be disposed in housing 102 and attached to top cover 102A. In some examples, antenna module 108 may be disposed on a circuit board (e.g., a motherboard of electronic device 100), which may be attached to top cover 102A.

Figure 1C:
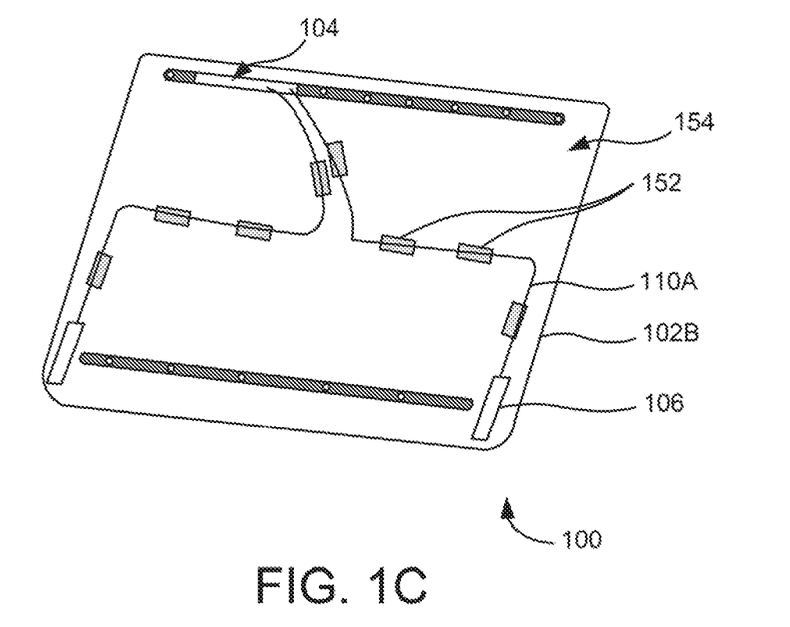
FIG. 1C is a top view of the bottom cover of FIG. 1B, depicting a portion of the cable fixed to the bottom cover via supporting features.

In one example, cable 110 may include a first portion 110A disposed within housing 102 and fixed to bottom cover 102B (e.g., at an internal surface of housing 102) via a supporting feature (e.g., supporting feature 152 as shown in FIG. 1C). A first terminal of cable 110 that is within housing 102 may be connected to antenna 106. Further, cable 110 may include a second portion 110B routed via, opening 104 to an exterior of electronic device 100 and connected to antenna module 108 via opening 104 (e.g., as shown in FIG. 1B). A second terminal of cable 110 that is exterior of electronic device 100 may be connected to antenna module 108 via opening 104.

In this example, second portion 110B and a portion of antenna module 108 that corresponds to opening 104 can be accessible from an exterior of electronic device 100 through opening 104 during service and/or assembly of electronic device 100. In this example, cable 110 can be connected to or disconnected from antenna module 108 through opening 104 during assembly and/or service of electronic device 100.

In other example, multiple antennas (e.g., antennas 106 and 114) may be attached to bottom cover 102B and can be connected to antenna module 108 through opening 104. For example, antennas 106 and 114 may be positioned within a wall (e.g., bottom cover 102B) forming housing 102 at different locations around electronic device 100. In this example, cables 110 and 116 may connect respective antennas 106 and 114 to antenna module 108 via routing cables 110 and 116 through opening 104.

FIG. 1C is a top view of bottom cover 102B, depicting first portion 110A fixed to bottom cover 102B via supporting features 152. For example, similarly named elements of FIG. 1C may be similar in structure and/or function to elements described with respect to FIGS. 1A and 1B. In one example, antenna 106 may be fixed to a top side 154 of bottom cover 102B. Further, first portion 110A may be connected to antenna 106. Furthermore, first portion 110A may be fixed/attached to top side 154 of bottom cover 102B via supporting features 152. Example supporting features 152 may include, but not limited to, hooks and mylars. In other examples, first portion 110A may be fixed/attached to top side 154 via removable tapes (e.g., adhesive tapes).

Figure 1D:
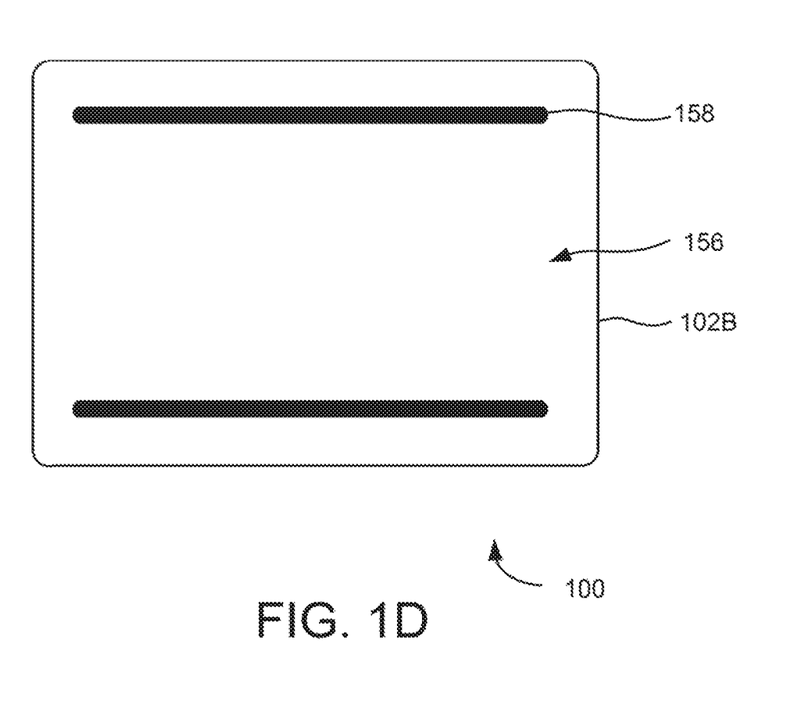
FIG. 1D is a bottom view of the bottom cover of FIG. 1B, depicting removable structure fixed to the bottom side to cover the opening.

FIG. 1D is a bottom view of bottom, cover 102B, depicting a removable structure 158 fixed to bottom side 156 to cover the opening (e.g., opening 104 of FIGS. 1A-1C). Bottom side 156 is opposite to top side (e.g., top side 154 of FIG. 1C). For example, similarly named elements of FIG. 1D may be similar in structure and/or function to elements described with respect to FIGS. 1A to 1C. Example removable structure 158 may cover opening (e.g., opening 104) and second portion of cable (e.g., second portion 110B as shown in FIG. 1B). In some examples, removable structure 158 may be a foot pad (e.g., rubber foot) disposed on bottom side 156 (i.e., a bottom exterior surface) of bottom cover 102B to support electronic device 100 on a support surface.

Figure 2A:
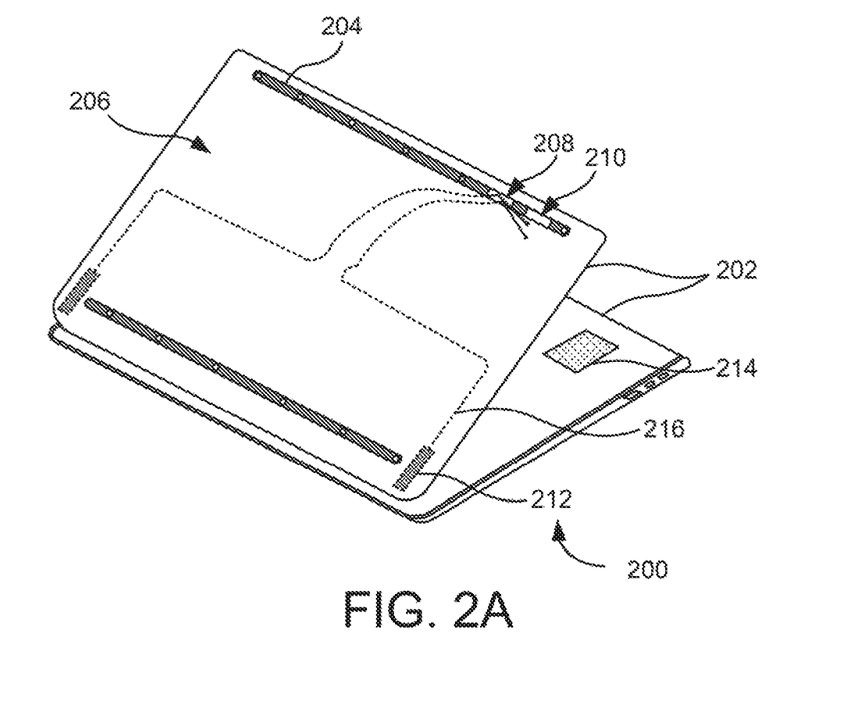
FIG. 2A is a perspective view of a bottom side of an example electronic device, depicting a cable routed through a foot pad area to electrically connect an antenna to an antenna module.

FIG. 2A is a perspective view of a bottom side 206 of an example electronic device 200, depicting a cable 216 routed through a foot pad area 204 to electrically connect an antenna 212 to an antenna module 214. Antenna assembly may be disposed in an interior of electronic device 200, i.e., inside a housing 202 of electronic device 200.

Electronic device 200 may include housing 202 having foot pad area 204 on bottom side 206. In one example, foot pad area 204 may include a recess portion at bottom side 206. Further, electronic device 200 may include a first opening 208 and a second opening 210 in foot pad area 204. First opening 208 and second opening 210 can be through holes defined in housing 202 at bottom side 206. Furthermore, electronic device 200 may include antenna 212 attached to housing 202 and antenna module 214 located within housing 202 corresponding to second opening 210.

Also, electronic device 200 may include cable 216 to electrically connect antenna 212 to antenna module 214 via routing cable 216 through foot pad area 204. In one example, cable 216 may be routed from an interior of housing 202 to an exterior of housing 202 through first opening 208 and connected to antenna module 214 from the exterior of housing 202 through second opening 210. In one example, a portion of cable 216 that is routed from the exterior of housing 202 may be accommodated in the recess portion of foot pad area 204. Further, a portion of cable 216 that is routed within electronic device 200 may be fixed to a top side of housing 202 via a supporting feature, such as hooks, or mylars. The top side may be opposite to bottom side 206.

Figure 2B:
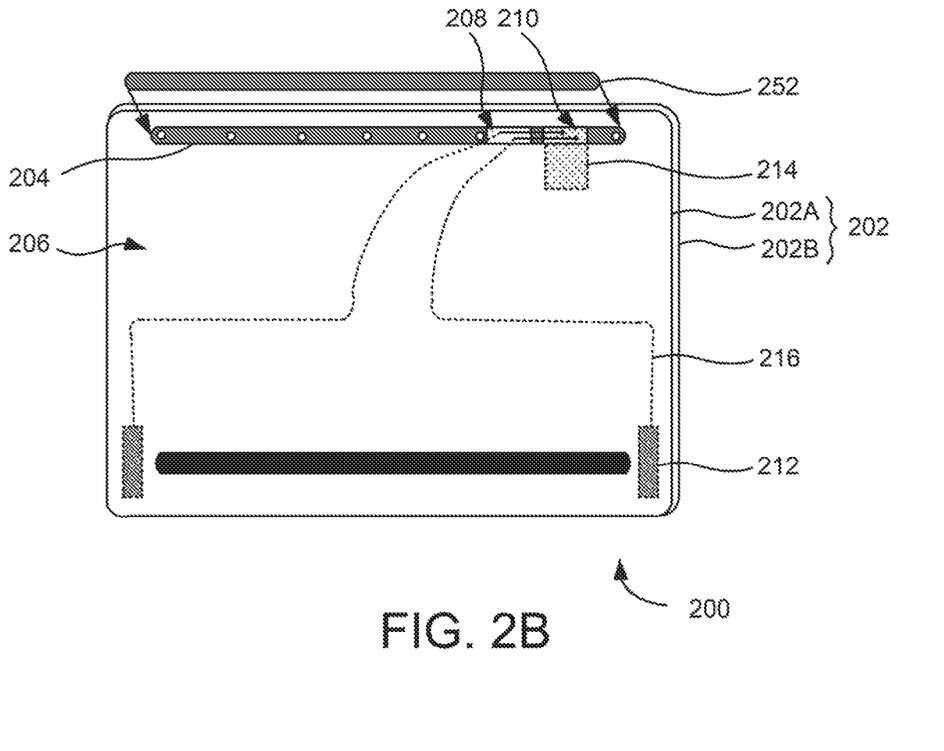
FIG. 2B is a bottom view of the example electronic, device, depicting additional features.

FIG. 2B is a bottom view of example electronic device 200, depicting additional features. For example, similarly named elements of FIG. 2B may be similar in structure and/or function to elements described with respect to FIG. 2A. Electronic device 200 may include a foot pad 252 to cover foot pad area 204 and a portion of cable 216 that is routed through foot pad area 204. Foot pad 252 may provide gripping for electronic device 200 on a ground surface. For example, electronic device 200 may include multiple foot pads that are uniformly spaced to facilitate electronic device 200 to stay firmly without sliding, when electronic device 200 is put on, for example, a desk. In this example, first and second openings 208 and 210 can be defined in any of the foot pads whose location corresponds to antenna module 214.

As shown in FIG. 2B, housing 202 may include a top cover 202B and a bottom cover 202A attached to top cover 202B. In this example, antenna 212 may be attached to bottom cover 202A and antenna module 214 may be attached to top cover 202B. In other examples, antenna 212 may be fixed along a side wall of bottom cover 202A. Further, cable 216 can be connected to or disconnected from antenna module 214 via second opening 210 to assemble or disassemble top cover 202B and bottom cover 202A during assembly and/or service of electronic device 200. In one example, during service, cable 216 can be disconnected from antenna module 214 via second opening 210 and then top cover 202B and bottom cover 202A can be separated. In another example, during assembly, top cover 202B and bottom cover 202A can be attached first and then, cable 216 can be connected to antenna module 214 via second opening 210.

Figure 3A:
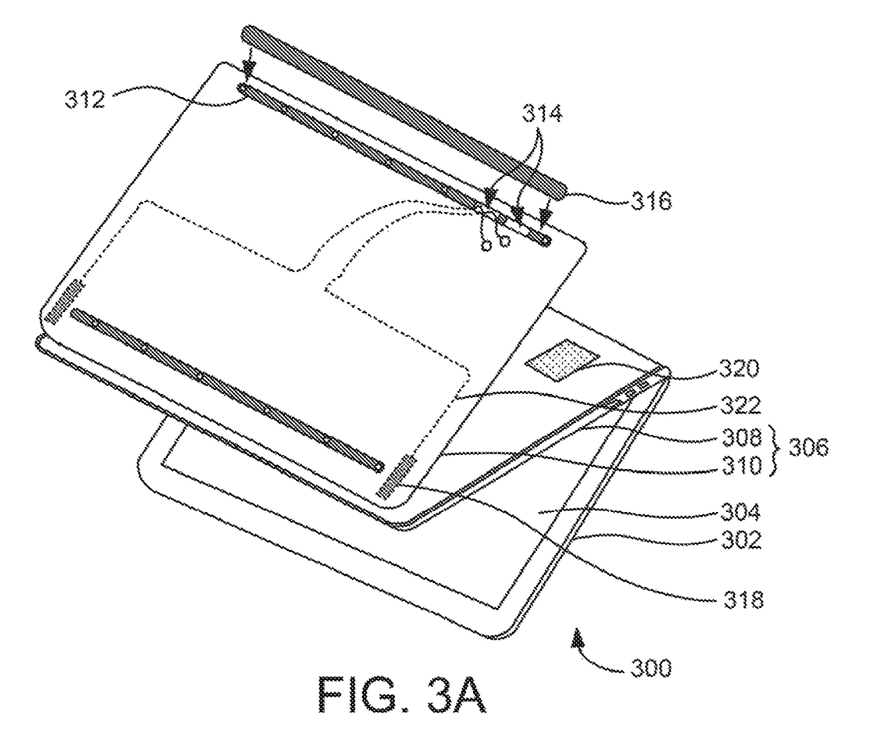
FIG. 3A is a perspective bottom view of an example electronic device, depicting a cable to connect an antenna and an antenna module that are mounted to different covers of a base housing via routing the cable through an opening.

FIG. 3A is a perspective bottom view of an example, electronic device 300, depicting a cable 322 to connect an antenna 318 and an antenna module 320 that are mounted to different covers of a base housing 306 via routing cable 322 through opening 314. Electronic device 300 may be a content rendering device that includes a wireless modem for connecting electronic device 300 to a network.

Example electronic device 300 may include a tablet computer, a notebook computer, an electronic book reader, a portable digital assistant, a mobile phone, a laptop computer, a portable media player, a camera, a video camera, a netbook, a desktop computer, a gaming console, a DVD player, a media center, or the like. Electronic device 300 may connect to the network to obtain content from a server (e.g., a content provider) or to perform other activities.

Figure 3B:
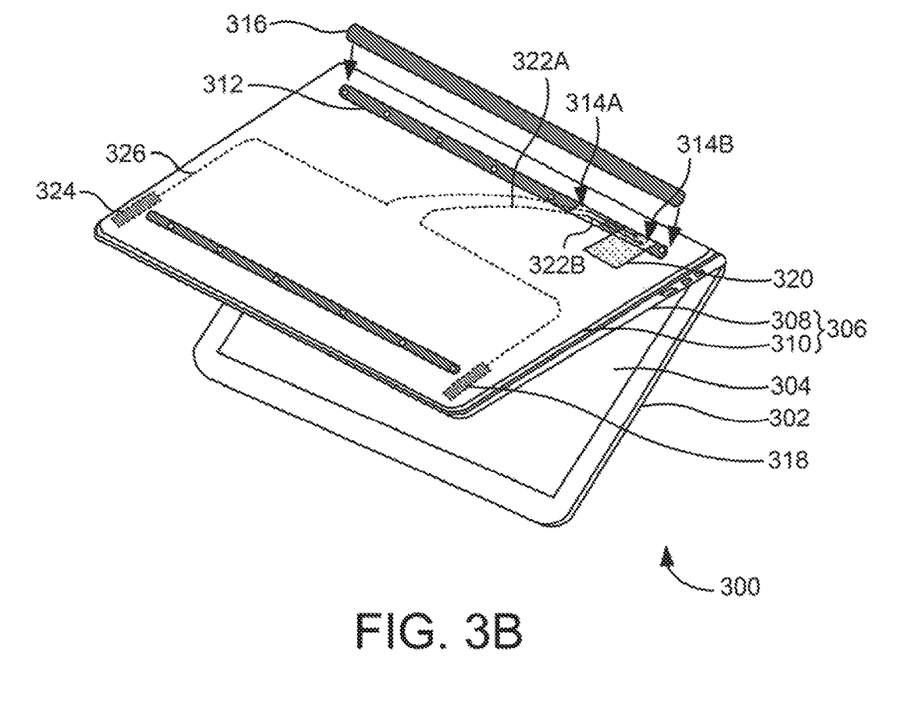
FIG. 3B is a perspective bottom view of the example electronic device of FIG. 3A, depicting additional features.

An example electronic device 300 such as a notebook computer or a tablet computer may be explained in FIGS. 3A and 3B. Referring to FIG. 3A, electronic device 300 may include a display housing 302. Further, electronic device 300 may include base housing 306 connected to display housing 302. In one example, base housing 306 and display housing 302 may be connected to each other via a hinge assembly. For example, the hinge assembly may pivotally, twistably, or detachably couple display housing 302 and base housing 306. For example, a motherboard and the electronic components, such as a hard disk, memory, peripheral ports, a battery, and the like may be assembled in base housing 306 to control the operation of electronic device 300, and an input apparatus, such as a keyboard and touchpad, may be positioned on a surface of base housing 306. Display housing 302 may include a display unit 304 (e.g., a touch-screen display).

Example display unit 304 may include liquid crystal display (LCD), light, emitting diode (LED) display, electroluminescent (EL) display, or the like. Also, electronic device 300 may be equipped with other components such as a camera, an audio/video device, or the like depending on the functions of electronic device 300. In some examples, electronic device 300 can be implemented without some of the components such as the keyboard and the touchpad.

As shown in FIGS. 3A and 3B, the antenna assembly may be disposed in base housing 306. In other examples, the antenna assembly may also be disposed in display housing 302 of electronic device 300. Base housing 306 may be formed of a top cover 308 and a bottom cover 310 attached to top cover 308. Example bottom cover 310 may be made of a metal, a carbon-fiber, or a combination thereof. Bottom cover 310 may include a foot pad area 312. In one example, bottom cover 310 may include opening 314 in foot pad area 312, Example opening 314 may be an elongated opening in foot pad area 312 or may include multiple openings in foot pad area 312. In some examples, opening 314 may be formed in bottom cover 310 by computer numerical control (CNC) machining.

Further, example bottom cover 310 may include a foot pad 316 to cover foot pad area 312. Example foot pad 316 may be a rubber foot to increase friction between electronic device 300 and a support surface on which electronic device 300 rests. Further, electronic device 300 may include the antenna assembly disposed in base housing 306.

In one example, the antenna assembly may include antenna 318 mounted to bottom cover 310 and antenna module 320 mounted to top cover 308 (e.g., via the motherboard) corresponding to opening 314 in foot pad area 312. In one example, antenna 318 may be attached to bottom cover 310 to enhance the antenna's performance. In some examples, bottom cover 310 may also provide a grounding function for antenna 318. Example antenna module 320 may include a radio frequency component to transmit and receive radio signals. For example, antenna module 320 may include a printed circuit board (PCB) with the radio frequency component such as a radio transceiver, a preamplifier, a filter, a microprocessor, a matching circuit, and the like to process, the radio signals.

Also, the antenna assembly may include cable 322 to connect antenna 318 to antenna module 320 via routing cable 322 through opening 314 and between foot pad area 312 (i.e., at a bottom side of bottom cover 310) and foot pad 316. Antenna 318 can be integrated to bottom cover 310 within base housing 306 and connected via cable 322 (e.g., a micro-coaxial cable) to antenna module 320.

In FIGS. 3A and 3B, foot pad area 312 may be located between two length sides of base housing 306. The length and width sides of foot pad area 312 may be parallel to the length and width sides of base housing 306, respectively. The term "parallel" in this disclosure may encompass substantially parallel and entirely parallel. The term "substantial" may encompass some insignificant minute amount of variation. In another example, foot pad area 312 may be located between two width sides of base housing 306 or may be tilted by a certain angle with respect to length sides or width sides such that a location of antenna module 320 corresponds to a portion of foot pad area 312. Also, foot pad area 312 and/or foot pad 316 can be designed in any shape such as a rectangular, circular, oval, square, or the like.

FIG. 3B is a perspective bottom view of example electronic device 300 of FIG. 3A, depicting additional features. As shown in FIG. 3B, top cover 308 may be attached to bottom cover 310 to form base housing 306. For example, similarly named elements of FIG. 3B may be similar in structure and/or function to elements described with respect to FIG. 3A.

Example opening 314 (e.g., as shown in FIG. 3A) in foot pad area 312 may include a first opening 314A and a second opening 314B. In one example, cable 322 (e.g., as shown in FIG. 3A) may be routed from an interior of base housing 306 to an exterior of base housing 306 via passing cable 322 through first opening 314A. Further, cable 322 may be connected to antenna module 320 from the exterior of base housing 306 via second opening 314B.

Further, cable 322 may include a first portion 322A that is routed within base housing 306 and fixed to a top side of bottom cover 310 via supporting features (e.g., as shown in FIG. 1C). Also, cable 322 may include a second portion 322B that is routed through foot pad area 312 (e.g., via first opening 314A) at the bottom side of bottom cover 310 and connected to antenna module 320 via opening 314 (e.g., via second opening 314B). The bottom side is opposite to the top side of bottom cover 310. In further examples, foot pad area 312 and foot pad 316 can be formed/designed between antenna 318 and antenna module 320 such that both first portion 322A and second portion 322B can be routed from an exterior bottom side of bottom cover 310 between foot pad area 312 and foot pad 316.

In other examples, the antenna assembly may utilize a pair of antennas (e.g., 318 and 324) mounted to bottom cover 310 within base housing 306 and connected to antenna module 320 via respective cables 322 and 326. In this example, cables 322 and 326 may be routed through foot pad area 312 at the bottom side of bottom cover 310 and connected to antenna module 320 via opening 314.

In one example, foot pad area 312 may include a recess portion at the bottom side to accommodate second portion 322B. In this example, foot pad 316 may cover the recess portion and second portion 322B of cable 322 such that the opening 314 and second portion 322B cannot be viewable from exterior of electronic device 300. Thus, examples described herein may not change or affect an aesthetic appearance of electronic device 300.

In one example, second portion 322B can be accessible from an exterior of electronic device 300 through foot pad area 312 and a portion of antenna module 320 that corresponds to opening 314 (e.g., second opening 314B) can be accessible from the exterior of electronic device 300 through opening 314 (e.g., by removing foot pad 316 that is attached to foot pad area 312). Particularly, cable 322 can be connected to or disconnected from antenna module 320 via second opening 314B during service and/or assembly of base housing 308. Also, routing cable 322 from the exterior of electronic device 300 may create space in an interior of electronic device 300 and also reduce complexity.

Even though examples of FIGS. 1-3 may be described with respect to an antenna assembly including an antenna and an antenna module, examples described herein can also be applicable to other assemblies where a first electronic component and a second electronic component are mounted to different covers that form a device housing and connected via a cable.

It may be noted that the above-described examples of the present solution are for the purpose of illustration only. Although the solution has been described in conjunction with a specific implementation thereof, numerous modifications may be possible without materially departing from the teachings and advantages of the subject matter described herein, Other substitutions, modifications and changes may be made without departing from the spirit of the present solution. All of the features disclosed in this specification (including, any accompanying claims, abstract, and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An electronic device comprising:
   a housing having an opening within a recess portion; and
   an antenna assembly disposed in the housing, wherein the antenna assembly comprises:
      an antenna mounted to the housing;
      an antenna module disposed corresponding to the opening; and
      a cable to connect the antenna to the antenna module via routing the cable from the antenna through the opening into the recess portion to the antenna module back through the opening.

2. The electronic device of claim 1, wherein the opening is defined in a bottom cover of the housing, and wherein the antenna is mounted to the bottom cover of the housing.

3. The electronic device of claim 2, wherein the cable comprises:
   a first portion within the housing and fixed to the bottom cover via a supporting feature; and
   a second portion routed via the opening to an exterior of the electronic device and connected to the antenna module via the opening.

4. The electronic device of claim 3, further comprising a removable structure to cover the opening and the second portion of the cable.

5. The electronic device of claim 4, wherein the removable structure is a foot pad disposed on a bottom exterior surface of the bottom cover to support the electronic device on a support surface.

6. An electronic device comprising:
   a housing having a foot pad area that includes a recess portion on a bottom side;
   a first opening and a second opening in the foot pad area;
   an antenna attached to the housing;
   an antenna module located within the housing corresponding to the second opening; and
   a cable to electrically connect the antenna to the antenna module via routing the cable through the foot pad area, wherein the cable is routed from an interior of the housing to an exterior of the housing through the first opening such that a portion of the cable is accommodated in the recess portion and connected to the antenna module from the exterior of the housing through the second opening.

7. The electronic device of claim 6, further comprising:
   a foot pad to cover the foot pad area and a portion of the cable that is routed through the foot pad area.

8. The electronic device of claim 6, wherein a portion of the cable that is routed within the electronic device is fixed to a top side of the housing via a supporting feature, wherein the top side is opposite to the bottom side.

9. The electronic device of claim 6, wherein the housing comprises a top cover and a bottom cover attached to the top cover, and wherein the antenna is attached to the bottom cover and the antenna module is attached to the top cover.

10. An electronic device comprising:
a display housing having a display unit;
a base housing connected to the display housing, wherein the base housing comprises:
  a top cover;
  a bottom cover attached to the top cover, wherein the bottom cover comprises a foot pad area that includes a recess portion at the bottom cover; and
  a foot pad to cover the foot pad area; and
an antenna assembly disposed in the base housing, wherein the antenna assembly comprises:
  an antenna mounted to the bottom cover;
  an antenna module mounted to the top cover corresponding to an opening in the foot pad area, wherein the antenna module comprises a radio frequency component to transmit and receive radio signals; and
  a cable to connect the antenna to the antenna module via routing the cable through the opening such that a portion of the cable is accommodated in the recess portion and positioned between the foot pad area and the foot pad.

11. The electronic device of claim 10, wherein the opening in the foot pad area comprises:
  a first opening, wherein the cable is routed from an interior of the base housing to an exterior of the base housing via the first opening; and
  a second opening, wherein the cable is connected to the antenna module from the exterior of the base housing via the second opening.

12. The electronic device of claim 10, wherein the cable comprises:
  a first portion that is routed within the base housing and fixed to a top side of the bottom cover via a supporting feature; and
  a second portion that is routed through the foot pad area at a bottom side of the bottom cover and connected to the antenna module via the opening.

13. The electronic device of claim 12, wherein the second portion of the cable is accessible from an exterior of the electronic device through the foot pad area and a portion of the antenna module that corresponds to the opening is accessible from the exterior of the electronic device through the opening.

14. The electronic device of claim 12, wherein the foot pad area comprises a recess portion at the bottom side to accommodate the second portion of the cable, and wherein the foot pad is to cover the recess portion and the second portion of the cable.

* * * * *